US012609719B2

(12) United States Patent
Shaw et al.

(10) Patent No.: US 12,609,719 B2
(45) Date of Patent: Apr. 21, 2026

(54) ARCHITECTURE FOR HIGH TEMPERATURE RADIO FREQUENCY SMART NODE

(71) Applicant: RTX Corporation, Farmington, CT (US)

(72) Inventors: William Richard Shaw, Westbrook, CT (US); Joseph V. Mantese, Ellington, CT (US); Gurkan Gok, Milford, CT (US); Joseph Zacchio, Wethersfield, CT (US); Sharbel Elias Azzi, Palm Beach Gardens, FL (US); Jonathan J. Gilson, West Hartford, CT (US); Coy B. Wood, Ellington, CT (US); Andre M. Ajami, Henderson, NV (US)

(73) Assignee: RTX CORPORATION, Farmington, CT (US)

( * ) Notice: Subject to any disclaimer, the term of this patent is extended or adjusted under 35 U.S.C. 154(b) by 479 days.

(21) Appl. No.: 18/183,717

(22) Filed: Mar. 14, 2023

(65) Prior Publication Data

US 2024/0313811 A1     Sep. 19, 2024

(51) Int. Cl.
| | |
|---|---|
| *H04B 1/59* | (2006.01) |
| *H01Q 1/28* | (2006.01) |
| *H04B 1/03* | (2006.01) |
| *H04B 1/04* | (2006.01) |
| *H04B 1/08* | (2006.01) |
| *H04B 5/45* | (2024.01) |

(52) U.S. Cl.
CPC ................ *H04B 1/03* (2013.01); *H01Q 1/28* (2013.01); *H04B 1/04* (2013.01); *H04B 1/08* (2013.01)

(58) Field of Classification Search
CPC ... H04B 1/03; H04B 1/04; H04B 1/08; H04B 3/52; H04B 1/1018; H04B 1/59; H04B 5/45; H01Q 1/28
See application file for complete search history.

(56) References Cited

U.S. PATENT DOCUMENTS

| | | | | |
|---|---|---|---|---|
| 5,833,603 A | * | 11/1998 | Kovacs ..................... | G01J 3/02 600/109 |
| 9,608,698 B2 | * | 3/2017 | Sessink .............. | G06K 19/0724 |

(Continued)

FOREIGN PATENT DOCUMENTS

| | | |
|---|---|---|
| EP | 3979510 A1 | 4/2022 |

OTHER PUBLICATIONS

Extended European Search Report for EP Application No. 24163677. 8; Issue Date, Jul. 25, 2024.

*Primary Examiner* — Andrew Wendell

(74) *Attorney, Agent, or Firm* — CANTOR COLBURN LLP

(57) ABSTRACT

An aircraft includes a communication system having a node and includes a method of operating the aircraft with the communication system. The communication system includes a waveguide and the node. The node is located in a high temperature environment. The node includes a high temperature logic circuit, a power supply, wherein the high temperature logic circuit and the power supply are disposed on a first side of the node in a high temperature environment, and a transponder disposed on a second side of the node. A sensor and/or an actuator can be operated via communication with the node via the waveguide.

17 Claims, 4 Drawing Sheets

(56)        References Cited

U.S. PATENT DOCUMENTS

| | | | | |
|---|---|---|---|---|
| 10,930,992 | B1 * | 2/2021 | Barzegar | H04B 3/56 |
| 11,265,380 | B1 | 3/2022 | Gilson et al. | |
| 11,277,163 | B2 | 3/2022 | Gilson et al. | |
| 11,277,676 | B2 | 3/2022 | Gilson et al. | |
| 11,303,311 | B1 | 4/2022 | Gilson et al. | |
| 11,469,813 | B2 | 10/2022 | Gilson et al. | |
| 11,509,032 | B2 | 11/2022 | Blackwell et al. | |
| 2004/0091097 | A1 * | 5/2004 | Tsuruya | H04M 19/008 |
| | | | | 379/399.01 |
| 2014/0078013 | A1 * | 3/2014 | Mejia | H01Q 1/22 |
| | | | | 343/788 |
| 2016/0294033 | A1 * | 10/2016 | Larsen | H01P 3/04 |
| 2017/0207651 | A1 * | 7/2017 | Geng | H01M 10/44 |
| 2018/0000556 | A1 * | 1/2018 | Blair | A61B 90/98 |
| 2018/0341033 | A1 * | 11/2018 | Olivier | G01V 1/3852 |
| 2019/0162841 | A1 * | 5/2019 | Peckham | G01S 5/0027 |
| 2020/0308978 | A1 | 10/2020 | Soto | |
| 2021/0013595 | A1 * | 1/2021 | Ramsey | G01S 13/86 |
| 2022/0109327 | A1 | 4/2022 | Gilson et al. | |
| 2022/0120221 | A1 | 4/2022 | Blackwell et al. | |
| 2022/0124596 | A1 | 4/2022 | Schafer et al. | |
| 2023/0307556 | A1 * | 9/2023 | Hsu | H10D 62/8325 |

* cited by examiner

Hardware Domains & Software Distribution

ARCHITECTURE FOR HIGH TEMPERATURE RADIO FREQUENCY SMART NODE

BACKGROUND

Exemplary embodiments pertain to the art of communication systems and, more particularly, to radio frequency communication in systems operating in high temperature environments.

Radio frequency communication can be channeled through radio frequency waveguides, such as hollow tubes or tubes filled with dielectric material. A system of radio frequency waveguides can be placed between a first device at a first location and a second device at a second location to allow radio frequency communication between them. The first device can be a controller and the second device can be a node or smart node coupled to a sensor or actuator. In some operational scenarios, the second device is located in a high temperature environment such as at around 200° Celsius. In such environments, the operation of the second device, as well as communication with the second device, can be impaired.

BRIEF DESCRIPTION

Disclosed is a node of a communication system. The node includes a high temperature logic circuit, a power supply, wherein the high temperature logic circuit and the power supply are disposed on a first side of the node in a high temperature environment, and a transponder disposed on a second side of the node.

In addition to one or more of the features described herein, the first side is a high temperature side operating in a temperature range of from about 125° C. to about 500° C. and the second side is a low temperature side operating in a temperature range of from about −40° C. to about 125° C.

In addition to one or more of the features described herein, the high temperature environment is in a range of about 125 degrees Celsius to about 250 degrees Celsius.

In addition to one or more of the features described herein, the high temperature logic circuit, the power supply and the transponder are components assembled onto a silicon on insulator substrate.

In addition to one or more of the features described herein, the power supply includes a rectifier made of at least one of: (i) SiC; (ii) GaN; and (iii) SOI.

In addition to one or more of the features described herein, the transponder is made of GaN.

In addition to one or more of the features described herein, the high temperature environment is one of: (i) an aircraft engine; (ii) a borehole for petroleum exploration; (iii) a turbine used in energy generation; (iv) a nuclear power system; and (v) an automobile.

In addition to one or more of the features described herein, the node further includes a serial link between the high temperature logic circuit and the transponder.

In addition to one or more of the features described herein, the high temperature logic circuit communicates with one of a sensor and an actuator via a radio frequency waveguide.

Also disclosed is a communication system for an aircraft. The communication system includes a waveguide and a node in communication with the waveguide and located in a high temperature environment. The node includes a high temperature logic circuit, a power supply, wherein the high temperature logic circuit and the power supply are disposed on a first side of the node in the high temperature environment, and a transponder disposed on a second side of the node.

In addition to one or more of the features described herein, the first side is a high temperature side operating in a temperature range of from about 125° C. to about 500° C. and the second side is a low temperature side operating in a temperature range of from about −40° C. to about 125° C.

In addition to one or more of the features described herein, the high temperature environment is in a range of about 125 degrees Celsius to about 250 degrees Celsius.

In addition to one or more of the features described herein, the high temperature logic circuit, the power supply and the transponder are components assembled onto a silicon on insulator substrate.

In addition to one or more of the features described herein, the power supply includes a rectifier made of at least one of: (i) SiC; (ii) GaN; and (iii) SOI.

In addition to one or more of the features described herein, the transponder is made of GaN.

In addition to one or more of the features described herein, the node further includes a serial link between the high temperature logic circuit and the transponder.

In addition to one or more of the features described herein, the high temperature logic circuit communicates with one of a sensor and an actuator via the waveguide.

Also disclosed is a method of operating an aircraft. The method includes disposing a node of a radio frequency communication system in a high temperature environment of an aircraft engine and in communication with a waveguide of the communication system. The node includes a high temperature logic circuit, a power supply, wherein the high temperature logic circuit and the power supply are disposed on a first side of the node in the high temperature environment, and a transponder disposed on a second side of the node. One of a sensor and an actuator is operated via communication with the node via the waveguide.

In addition to one or more of the features described herein, the power supply includes a rectifier made of at least one of: (i) SiC; (ii) GaN; and (iii) SOI.

In addition to one or more of the features described herein, the method further includes communicating between the high temperature logic circuit and the transponder via a serial link.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Various embodiments of the present disclosure are related to electromagnetic communication through and to components of a machine operating in a high temperature environment. A high temperature environment can include a region of a machine or engine which generates heat. In various embodiments, a high temperature environment is an environment in which the temperature is between about 150 degrees Celsius and 500 degrees Celsius.

Figure 1:
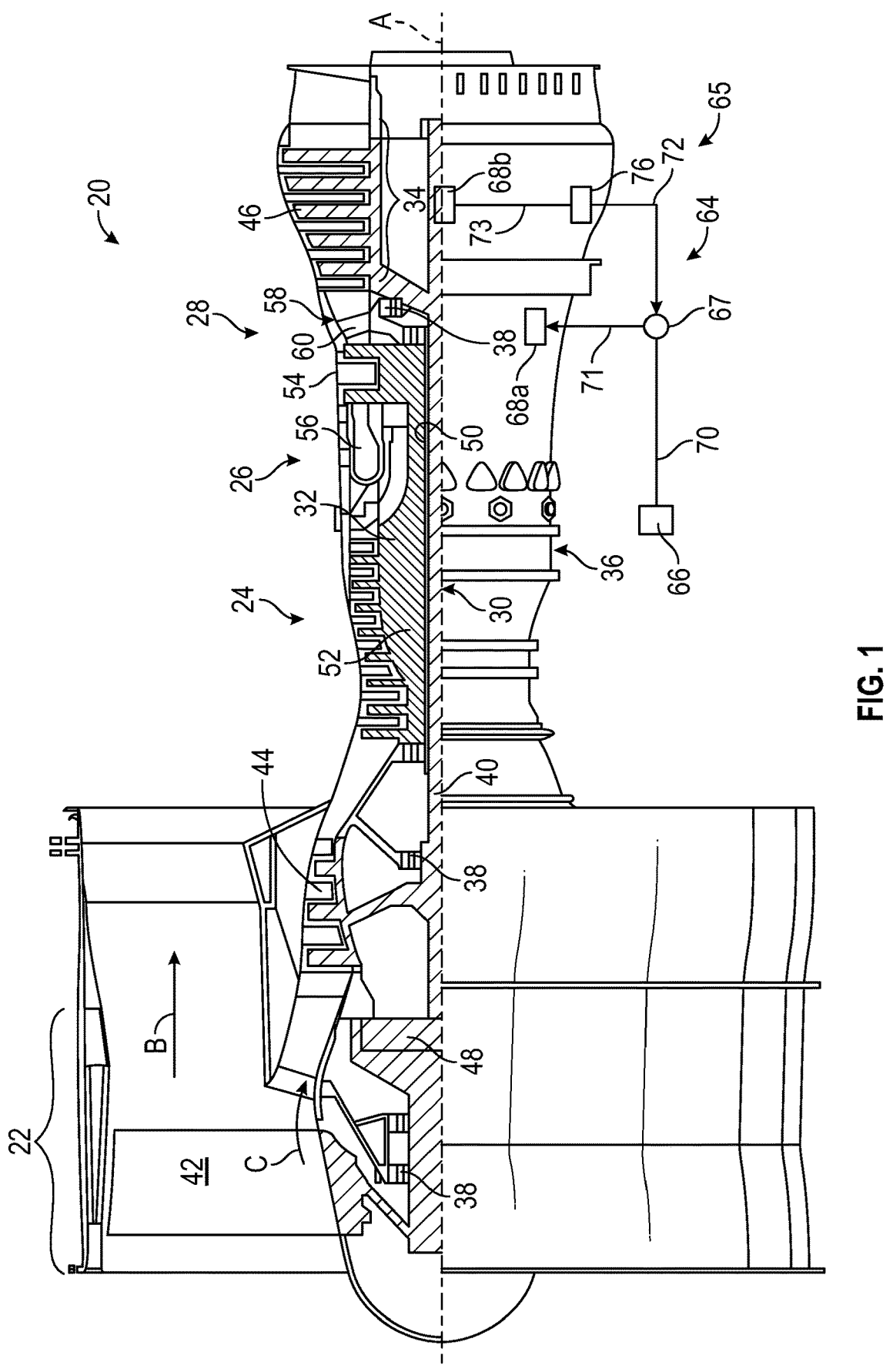
FIG. 1 schematically illustrates a gas turbine engine as one example of a machine as further described herein.

FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low-speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low-speed spool 30. The high-speed spool 32 includes an outer shaft 50 that interconnects a second (or high) pressure compressor 52 and a second (or high) pressure turbine 54. A combustor 56 is arranged in exemplary gas turbine engine 20 between the high-pressure compressor 52 and the high-pressure turbine 54. A mid-turbine frame 58 of the engine static structure 36 is arranged generally between the high-pressure turbine 54 and the low-pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low-pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low-pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The nodes 68a, 68b can be distributed throughout the gas turbine engine 20 or other such machine. Node 68a is an example of an actuator node that can drive one or more actuators/effectors of the gas turbine engine 20. Node 68 b is an example of a sensor node that can interface with one or more sensors of the gas turbine engine 20. Nodes 68a, 68b can include processing support circuitry to transmit/receive electromagnetic signals between sensors or actuators and the controller 66. A coupler 67 can be configured as a splitter between a waveguide 70 coupled to the controller 66 and waveguides 71 and 72 configured to establish wireless communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the radio frequencies (e.g., electromagnetic signals) between the controller 66 and one or more of the nodes 68a. 68b. The transmission media within waveguides 70-73 may include dielectric or gaseous material. In embodiments, the waveguides 70-73 can be hollow metal tubes. The waveguides 70-73 may be rigid or may include flexible material. The disclosed system 64 may be utilized to control and/or monitor any component function or characteristic of a turbomachine, aircraft component operation, and/or other machines.

Exemplary embodiments can use radio frequencies guided by the waveguides 70-73 in a wireless architecture to provide both electromagnetic communication signals and power to the individual elements of the network 65. The use of electromagnetic radiation in the form of radio waves (MHz to GHz) to communicate and power the sensors and actuators vs. using a traditionally complex wired system provides substantial architectural simplification, especially as it pertains to size, weight, and power (SWaP). Embodiments provide extension of a network where reduced SNR may compromise network performance by trading off data rates for an expansion of the number of nodes and distribution lines; thereby providing more nodes/sensors, with greater interconnectivity.

Figure 2:
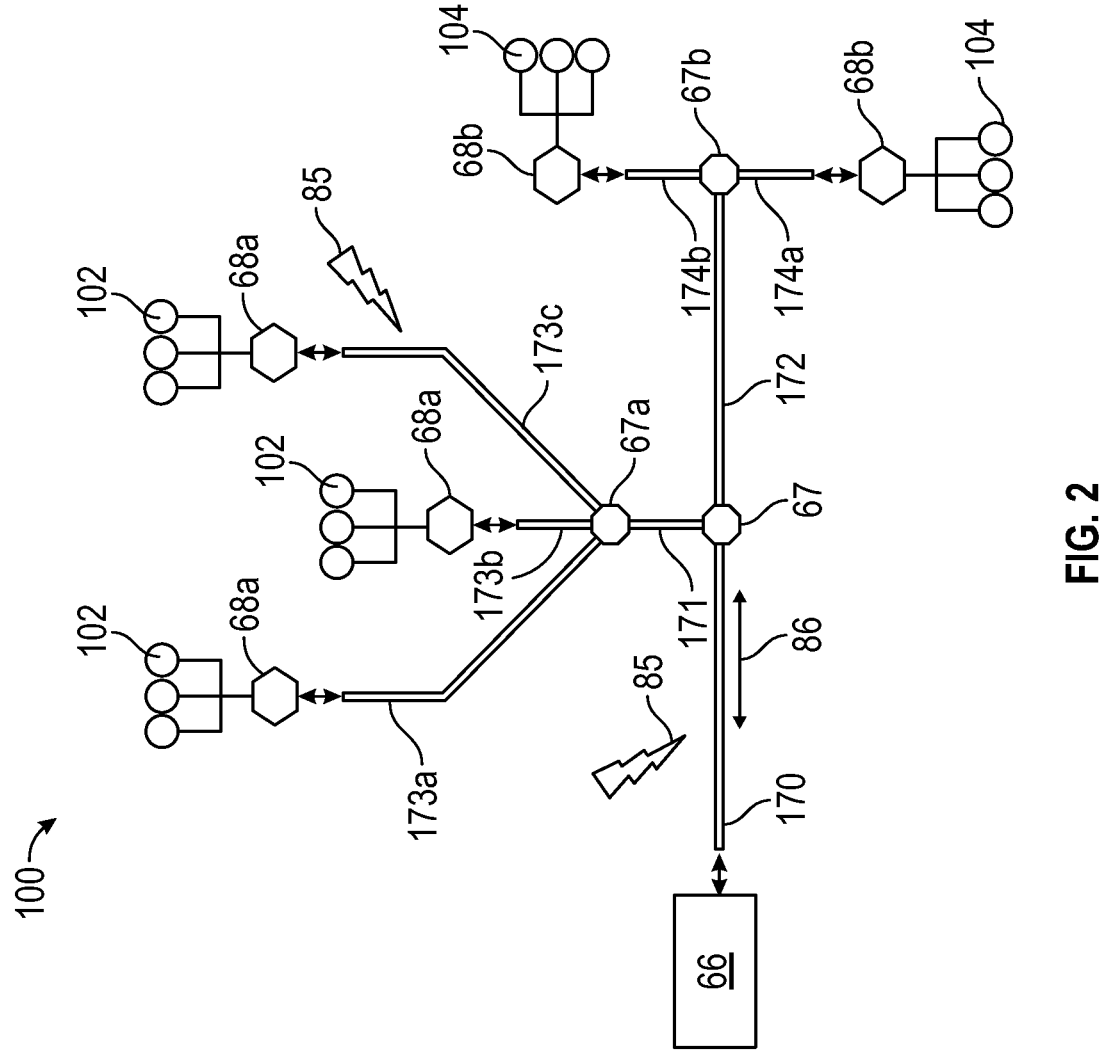
FIG. 2 depicts a guided electromagnetic transmission network as an example expansion of a network shown in FIG. 1.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Coupler 67a is further coupled to three nodes 68a through waveguides 173a, 173b, 173c in parallel. Each of the nodes 68a can interface or be combined with multiple actuators 102. Coupler 67b is also coupled to two nodes 68b through waveguides 174a, 174b in parallel. Each of the nodes 68b can interface or be combined with multiple sensors 104. Although the example of FIG. 2 depicts connections to actuators 102 and sensors 104 isolated to different branches, it will be understood that actuators 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a. 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68, 68b can transmit power and signals.

The example nodes 68a, 68b may include radio-frequency identification devices along with processing, memory and/or the interfaces to connect to conventional sensors or actuators, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and provide unauthorized access to information. In some embodiments, guided electromagnetic radiation is in the range 1-100 GHz. Electromagnetic radiation can be more tightly arranged around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 68a, 68b using various modulation and signaling techniques.

The nodes 68a with actuators 102 may include control devices, such as a solenoid, switch or other physical actuation devices. Radio frequency identification, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

The guided electromagnetic transmission network 100 may be installed in a mixed temperature environment, such as a machine having a hotter portion and a cooler portion. In reference to the example of FIG. 1, the fan section 22 and compressor section 26 of the gas turbine engine 20 can be designated as cooler portions relative to hotter portions of the gas turbine engine 20, such as the combustor section 26 and turbine section 28. To further accommodate the temperature variations within the gas turbine engine 20, a variety of approaches can be used. As one example, electronics devices within the nodes 68a, 68b, actuators 102, and/or sensors 104 can include wide band gap semiconductor devices, such as silicon carbide or gallium nitride devices supporting higher operating temperatures than typical semiconductor devices. Further, the controller 66 is operable to communicate with the network of nodes 68a, 68b through the two or more radio frequencies using a higher frequency to communicate with one or more of the nodes 68a, 68b in the cooler portion of the machine and a lower frequency to communicate with one or more of the nodes 68a, 68b in the hotter portion of the machine. As an example, communication between the controller 66 and nodes 68a, 68b at the fan section 22 or compressor section 26 of the gas turbine engine 20 may use radio frequencies at or above 1 GHz, while communication to nodes 68a, 68b at the combustor section 26 or turbine section 28 may use frequencies at or below 1 GHz. The radio frequency threshold selected can depend on resultant heating effects that can occur at higher frequencies. Placement of the nodes 68a, 68b can also impact performance capabilities in the hotter portion of the machine. Where actuators 102 or sensors 104 are needed at locations that would potentially exceed the desired operating temperature of the nodes 68a, 68b that directly interface with the actuators 102 or sensors 104, relatively short-wired connections, referred to as "pigtails" can be used between the nodes 68a, 68b and the actuators 102 or sensors 104. The pigtail wiring can provide thermal separation and may support the use of legacy wired actuators 102 and sensors 104 to connect with nodes 68a, 68b. Further temperature accommodations may include cooling systems, heat sinks, and the like.

In some embodiments, shielding in the guided electromagnetic transmission network 100 can be provided such that power and communication signals are shielded from outside interference, which may be caused by environmental electromagnetic or optic interference. Moreover, the shielding limits intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for monitored or controlled components in a guided electromagnetic transmission network. For example, the system 64 can be incorporated in a variety of harsh environment machines, such as manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while enabling additional redundancy. Moreover, additional sensors can be added without the need for additional wiring and physical connections to the controller 66, which may provide for increased system accuracy and response. Embodiments can provide a "plug-n-play" approach to add a new node, potentially without a requalification of the entire system but only the new component; thereby greatly reducing qualification burdens.

Figure 3:
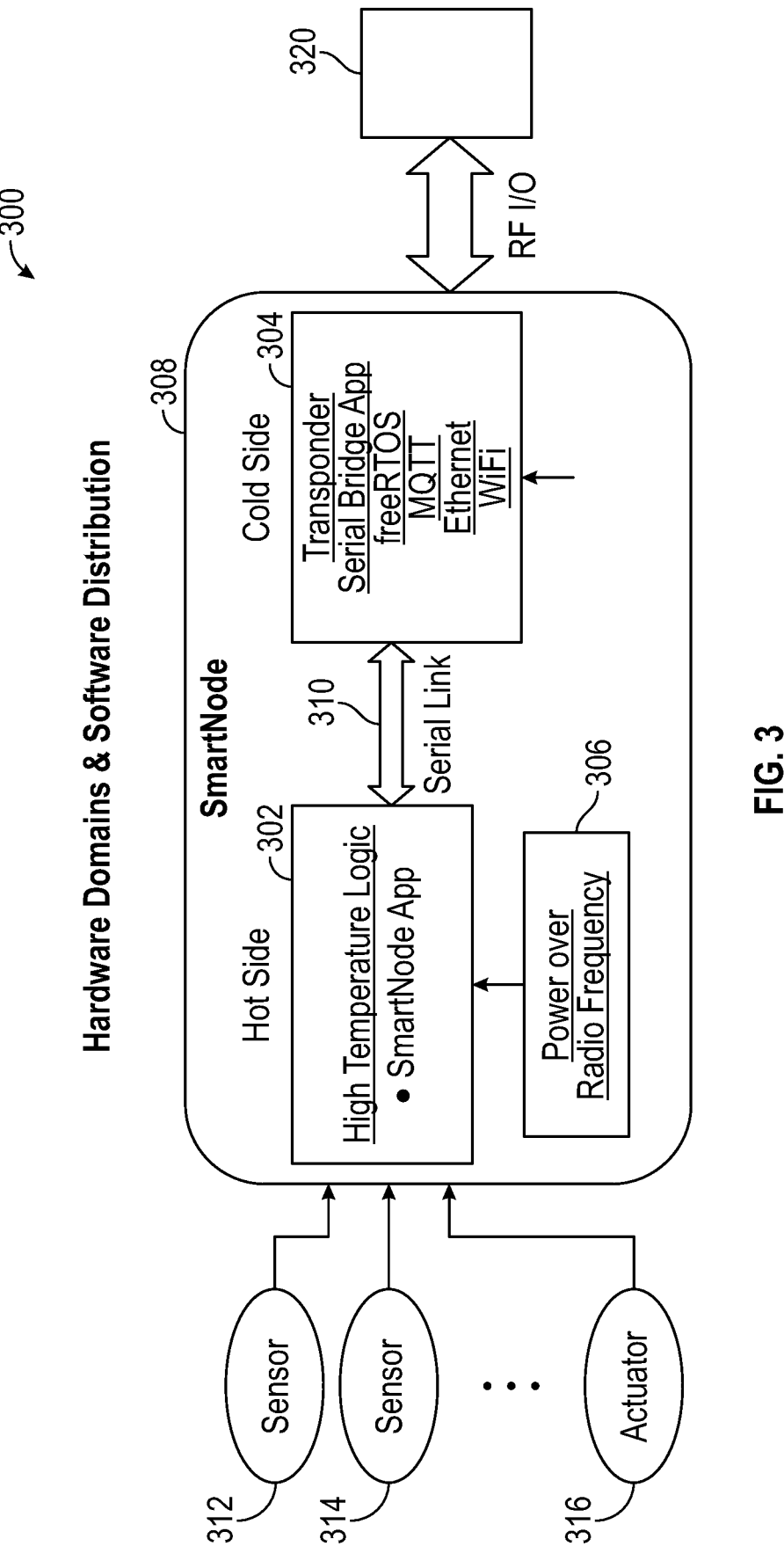
FIG. 3 is a schematic diagram showing an architecture of a node of the communication system suitable for operation in a high temperature environment, in an embodiment.

FIG. 3 is a schematic diagram showing an architecture of a node 300 of the communication system suitable for operation in a high temperature environment, in an embodiment. The high temperature environment can be, for example, an environment of the aircraft engine of FIG. 1 when in operation or any environment having temperatures in a range attainable by operating the aircraft engine. In various embodiments, a high temperature environment has a temperature between about 125 degrees Celsius and about 500 degrees Celsius. In various embodiments, the high temperature environment has a temperature of about 200 degrees Celsius.

The node 300 can be a smart node capable of communication with sensors 312, 314 and actuators 316 which are also located within the high temperature environment. includes a high temperature logic circuit 302, a transponder 304 and a power supply 306 formed on a substrate 308 that is compatible with high temperatures, such as a silicon on insulator (SOI) substrate. The high temperature logic circuit 302, transponder 304 and power supply 306 can be individual components assembled onto the substrate 308 as individual components or can be part of an application specific integrated circuit (ASIC). The node 300 both receives power and communicates data using a radio frequency wireless network, such as described with respect to FIG. 2.

The high temperature logic circuit 302 and power supply 306 are located at a "high" side (or high temperature side) of the substrate 308 near the sensors 312, 314 that detect the values of various parameters and actuators 316 that can be used to perform various operations. The high temperature logic circuit 302 is in communication with the sensors 312, 314 and actuators 316. The transponder 304 is located at a "low" side (or low temperature side) of the substrate 308 near an associated waveguide 320 for communication via the associated waveguide 320. The high temperature logic circuit 302 is in communication with the transponder 304 via a serial link 310 extending between the "high" side and the "low" side". A "high" side can operate in a temperature range from about 125 degrees Celsius to about 250 degrees Celsius or from about 125 degrees Celsius to about 500 degrees Celsius and a "low" side can operate in a temperature range from about-40 degrees Celsius to about 125 degrees Celsius.

The transponder 304 is a radio frequency transponder that has input and output through the associated waveguide 320 via radio frequency signals. The radio frequency signals can be power signals or data signals. The transponder 340 can be made of material suitable for operation in the high temperature environments, such as GaN.

The power supply 306 provides power to the high temperature logic circuit 302. The power supply 306 receives power over radio frequency via the associated waveguide 320 and provides the power to the high temperature logic circuit 302. The power supply 306 can include a rectifier that receives power transmitted through the associated waveguide 320 and converts the power into direct current for use at the high temperature logic circuit 302. The rectifier can be either a half wave rectifier or full wave rectifier and can be made of a material suitable for operating in the high temperature environment, including one or more of a silicon, Silicon on Insulator (SOI), Gallium Nitride (GaN), or Silicon Carbide (SIC).

Figure 4:
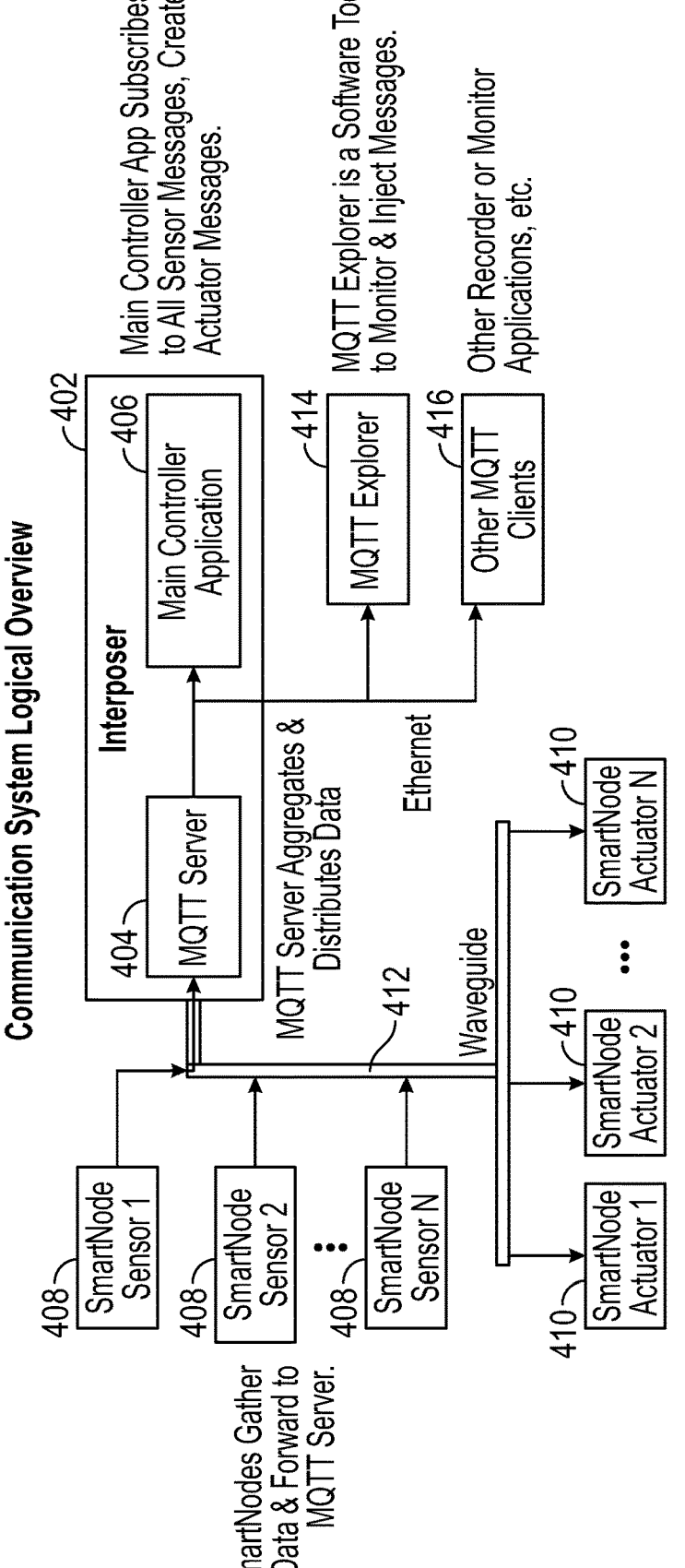
FIG. 4 is a diagram illustrating a software logic of a communication system.

FIG. 4 is a diagram illustrating a software logic 400 of a radio frequency communication system. The software logic 400 includes an interposer 402 (an electrical interface routing between one socket or connection to another) operating a Message Queueing Telemetry Transport server (MQTT server 404) and a main controller application 406.

The software logic 400 further includes sensor logic 408 from individual sensors (such as sensors 312, 314 and actuator logic 410 operating at individual actuators (such as actuators 316). The sensor logic 408 gathers data and forwards the data to the MQTT server 404. The actuator logic 410 responds to a message received from the MQTT server 404 by controlling a related actuator based on the message. The sensor logic 408 and actuator logic 410 communicate with the MQTT server 404 via transmission of data through waveguide 412.

The main controller application 406 subscribes to the sensor messages sent from the sensor logic 408 to the MQTT server 404 and creates actuator messages for sending to the actuator logic 410 via the MQTT server 404.

The MQTT server 404 is also in communication via Ethernet with an MQTT Explorer 414 and other MQTT clients 416. The MQTT Explorer 414 is a software tool for monitoring and injecting messages to the MQTT server 404.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A node of a communication system, comprising:
a high temperature logic circuit;
a power supply, wherein the high temperature logic circuit and the power supply are disposed on a first side of the node in a high temperature environment;
a transponder disposed on a second side of the node; and
a serial link between the high temperature logic circuit and the transponder.

2. The node of claim 1, wherein the first side is a high temperature side operating in a temperature range of from 125° C. to 500° C. and the second side is a low temperature side operating in a temperature range of from −40° C. to 125° C.

3. The node of claim 1, wherein the high temperature environment is in a range of 125 degrees Celsius to 250 degrees Celsius.

4. The node of claim 1, wherein the high temperature logic circuit, the power supply and the transponder are components assembled onto a silicon on insulator substrate.

5. The node of claim 1, wherein the power supply includes a rectifier made of at least one of: (i) Silicon Carbide; (ii) Gallium Nitride; and (iii) Silicon on Insulator.

6. The node of claim 1, wherein the transponder is made of Gallium Nitride.

7. The node of claim 1, wherein the high temperature environment is one of: (i) an aircraft engine; (ii) a borehole for petroleum exploration; (iii) a turbine used in energy generation; (iv) a nuclear power system; and (v) an automobile.

8. The node of claim 1, wherein the high temperature logic circuit communicates with one of a sensor and an actuator via a radio frequency waveguide.

9. A communication system for an aircraft, comprising:
a waveguide;
a node in communication with the waveguide and located in a high temperature environment, the node including:
a high temperature logic circuit;
a power supply, wherein the high temperature logic circuit and the power supply are disposed on a first side of the node in the high temperature environment;
a transponder disposed on a second side of the node; and
a serial link between the high temperature logic circuit and the transponder.

10. The communication system of claim 9, wherein the first side is a high temperature side operating in a temperature range of from 125° C. to 500° C. and the second side is a low temperature side operating in a temperature range of from −40° C. to 125° C.

11. The communication system of claim 9, wherein the high temperature environment is in a range of 125 degrees Celsius to 250 degrees Celsius.

12. The communication system of claim 9, wherein the high temperature logic circuit, the power supply and the transponder are components assembled onto a silicon on insulator substrate.

13. The communication system of claim 9, wherein the power supply includes a rectifier made of at least one of: (i) Silicon Carbide; (ii) Gallium Nitride; and (iii) Silicon on Insulator.

14. The communication system of claim 9, wherein the transponder is made of Gallium Nitride.

15. The communication system of claim 9, wherein the high temperature logic circuit communicates with one of a sensor and an actuator via the waveguide.

16. A method of operating an aircraft, comprising:
disposing a node of a radio frequency communication system in a high temperature environment of an aircraft engine and in communication with a waveguide of the communication system, the node comprising:
a high temperature logic circuit;
a power supply, wherein the high temperature logic circuit and the power supply are disposed on a first side of the node in the high temperature environment;
a transponder disposed on a second side of the node;
operating one of a sensor and an actuator via communication with the node via the waveguide; and
communicating between the high temperature logic circuit and the transponder via a serial link.

17. The method of claim 16, wherein the power supply includes a rectifier made of at least one of: (i) Silicon Carbide; (ii) Gallium Nitride; and (iii) Silicon on Insulator.

* * * * *